United States Patent
Doering et al.

(10) Patent No.: US 7,603,540 B2
(45) Date of Patent: *Oct. 13, 2009

(54) USING FIELD PROGRAMMABLE GATE ARRAY (FPGA) TECHNOLOGY WITH A MICROPROCESSOR FOR RECONFIGURABLE, INSTRUCTION LEVEL HARDWARE ACCELERATION

(75) Inventors: Andreas C. Doering, Adliswil (CH); Silvio Dragone, Adliswil (CH); Andreas Herkersdorf, Inning a. Ammersee (DE); Richard G. Hofmann, Apex, NC (US); Charles E. Kuhlmann, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,202

(22) Filed: Jul. 2, 2008

(65) Prior Publication Data
US 2008/0270754 A1    Oct. 30, 2008

Related U.S. Application Data

(63) Continuation of application No. 10/696,865, filed on Oct. 30, 2003.

(51) Int. Cl.
*G06F 9/00* (2006.01)
*G06F 15/00* (2006.01)
(52) U.S. Cl. .......................... 712/15; 712/37
(58) Field of Classification Search .............. 712/15
See application file for complete search history.

(56) References Cited

U.S. PATENT DOCUMENTS 5,937,179 A    8/1999    Swoboda (Continued)

FOREIGN PATENT DOCUMENTS

JP    10-320201    4/1998

(Continued)

OTHER PUBLICATIONS

Borgatti, Michele et al., "A Reconfigurable System Featuring Dynamically Extensible Embedded Microprocessor, FPGA, and Customizable I/O," IEEE Journal of Solid-State Circuits, vol. 38, No. 3, Mar. 2003, pp. 521-529.

(Continued)

*Primary Examiner*—Eddie P Chan
*Assistant Examiner*—Robert E Fennema
(74) *Attorney, Agent, or Firm*—Yee & Associates, P.C.; Mark E. McBurney (57) ABSTRACT

A method for dynamically programming Field Programmable Gate Arrays (FPGAs) in a coprocessor, the coprocessor coupled to a processor, includes: beginning an execution of an application by the processor; receiving an instruction from the processor to the coprocessor to perform a function for the application; determining that the FPGA in the coprocessor is not programmed with logic for the function; fetching a configuration bit stream for the function; and programming the FPGA with the configuration bit stream. In this manner, the FPGA are programmable "on the fly", i.e., dynamically during the execution of an application. The hardware acceleration and resource sharing advantages provided by the FPGA can be utilized more often by the application. Logic flexibility and space savings on the chip comprising the coprocessor and processor are provided as well.

3 Claims, 7 Drawing Sheets

U.S. PATENT DOCUMENTS

| | | |
|---|---|---|
| 6,023,755 A | 2/2000 | Casselman |
| 6,041,140 A | 3/2000 | Binns et al. |
| 6,249,858 B1 | 6/2001 | Hayakawa et al. |
| 6,467,009 B1 | 10/2002 | Winegarden et al. |
| 6,504,398 B1 | 1/2003 | Lien et al. |
| 6,504,399 B2 | 1/2003 | Pani et al. |
| 6,721,884 B1 | 4/2004 | De Oliveira Kastrup Pereira et al. |
| 6,754,881 B2 | 6/2004 | Kuhlmann et al. |
| 2002/0008540 A1 | 1/2002 | Britton et al. |
| 2002/0100029 A1 | 7/2002 | Bowen |
| 2002/0133725 A1 | 9/2002 | Roy et al. |
| 2002/0174411 A1 | 11/2002 | Feng et al. |
| 2002/0188885 A1 | 12/2002 | Sihlbom et al. |
| 2003/0025132 A1 | 2/2003 | Tobey |
| 2003/0039262 A1 | 2/2003 | Wong et al. |
| 2003/0056084 A1 | 3/2003 | Holgate et al. |
| 2005/0097305 A1* | 5/2005 | Doering et al. ............. 712/226 |

FOREIGN PATENT DOCUMENTS

| | | |
|---|---|---|
| JP | 2002175183 | 6/2002 |
| WO | WO 01/95099 | 6/2000 |
| WO | WO 00/49496 | 8/2000 |

OTHER PUBLICATIONS

Hauser, John R. et al., "Garp: A MIPS Processor with a Reconfigurable Coprocessor," IEEE 1997, pp. 12-21.

Hastie, N; Cliff, R., "The Implementation of Hardware Subroutines on Field Programmable Gate Arrays.", Proceedings of the IEEE, IEEE 1990 Custom Integrated Circuits Conference. May 13-16, 1990. pp. 31.4.1-31.4.4.

* cited by examiner

USING FIELD PROGRAMMABLE GATE ARRAY (FPGA) TECHNOLOGY WITH A MICROPROCESSOR FOR RECONFIGURABLE, INSTRUCTION LEVEL HARDWARE ACCELERATION

CROSS-REFERENCE TO RELATED APPLICATIONS

Under 35 USC §120, this application is a continuation application and claims the benefit of priority to U.S. patent application Ser. No. 10/696,865, filed Oct. 30, 2003, entitled "METHOD AND APPARATUS FOR USING FPGE TECHNOLOGY WITH A MICROPROCESSOR FOR RECONFIGURABLE, INSTRUCTION LEVEL HARDWARE ACCELERATION," the entire contents of which is hereby incorporated by reference.

FIELD OF THE INVENTION

The present invention relates to microprocessors, and more particularly, to the configuration of coprocessors associated with microprocessors.

BACKGROUND OF THE INVENTION

Figure 1:
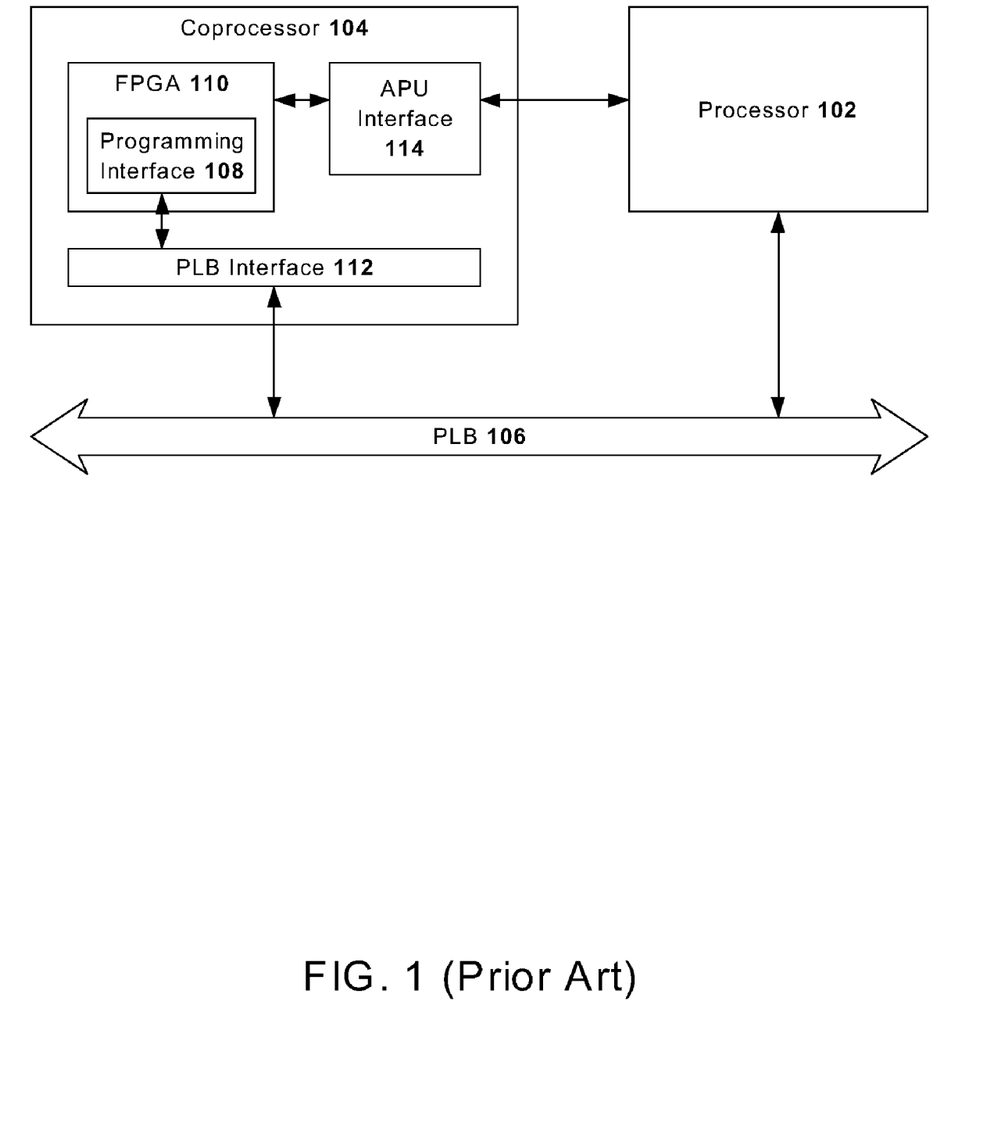
FIG. 1 illustrates a conventional apparatus utilizing an FPGA.

The use of Field Programmable Gate Arrays (FPGA) on an Application Specific Integrated Circuit (ASIC) chip and/or a system-on-a-chip to provide instruction level hardware acceleration and resource sharing is known in the art. FIG. 1 illustrates a conventional apparatus utilizing an FPGA. The apparatus can be an ASIC, a system-on-a-chip, or some other chip comprising a main processor 102, a coprocessor 104, and a local bus, such as the Processor Local Bus (PLB) 106 developed by International Business Machines Corporation™. Other local buses can also be used, such as the Advanced Micro-Controller Bus Architecture (AMBA) developed by ARM™. The coprocessor 104 comprises FPGA cells 110 and a plurality of interfaces. The interfaces include a programming interface 108, through which the FPGA 110 is programmed, a PLB interface 112, and an Auxiliary Processing Unit (APU) interface 114. The APU interface 114 enables special hardware accelerated functions to be tightly coupled to the processor 102 at the instruction flow level. For loosely coupled operations, the processor 102 communicates with the coprocessor 104 via the PLB 106. Fetched instructions inside the processor 102 are simultaneously shared with the coprocessor 104 through the APU interface. The coprocessor 104 signals the processor 102 when it sees a valid instruction, or operations code ("opcode"), for its execution unit. The coprocessor 104 then performs the requested function on operands supplied with the instruction and passes the result back to the processor 102 through the APU interface 114.

Conventionally, the logic inside the FPGA 110 is programmed by the system developer to perform specialized functions on the operands supplied by the processor 102. Multiple functions may be bit mapped inside the FPGA 110 to provide more than one operation for the coprocessor instruction. This programming is typically done during the set up of an application to be executed by the processor 102 or during chip initialization. However, if during execution of the application, the application requests a function not programmed into the FPGA 110, then the application cannot take advantage of the hardware acceleration or the resource sharing provided by the coprocessor 104, even if the requested function had existed in the library of functions available for programming the FPGA 110.

Accordingly, there exists a need for a method and apparatus for dynamically programming Field Programmable Gate Arrays (FPGA). The method and apparatus should allow FPGA's to be programmed or reprogrammed during application execution. The present invention addresses such a need.

SUMMARY OF THE INVENTION

A method for dynamically programming Field Programmable Gate Arrays (FPGA) in a coprocessor, the coprocessor coupled to a processor, includes: beginning an execution of an application by the processor; receiving an instruction from the processor to the coprocessor to perform a function for the application; determining that the FPGA in the coprocessor is not programmed with logic for the function; fetching a configuration bit stream for the function; and programming the FPGA with the configuration bit stream. In this manner, the FPGA is programmable "on the fly", i.e., dynamically during the execution of an application. The hardware acceleration and resource sharing advantages provided by the FPGA can be utilized more often by the application. Logic flexibility and space savings on the chip comprising the coprocessor and processor are provided as well.

DETAILED DESCRIPTION

The present invention provides a method and apparatus for dynamically programming Field Programmable Gate Arrays (FPGA). The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 7 in conjunction with the discussion below.

Figure 2:
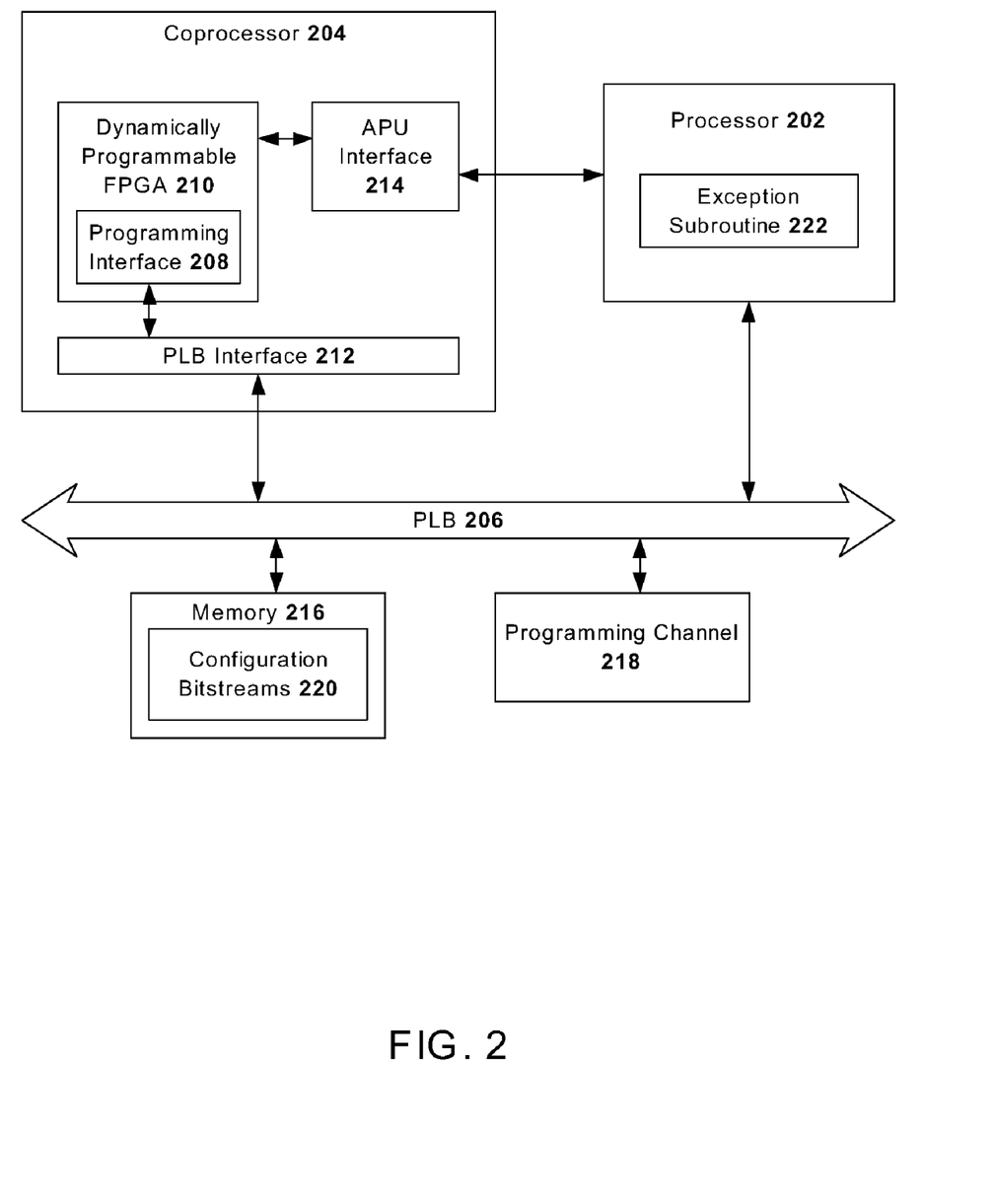
FIG. 2 illustrates a preferred embodiment of an apparatus for dynamically programming FPGA in accordance with the present invention.

FIG. 2 illustrates a preferred embodiment of an apparatus for dynamically programming an FPGA in accordance with the present invention. The apparatus comprises a main processor 202, a coprocessor 204, and a Processor Local Bus (PLB) 206 as the local bus. Other types of local buses may be used. As shown in the embodiment of FIG. 2, the coprocessor 204 is separate from the main processor 202. The processor 202 comprises an exception subroutine 222, which is described further below. The coprocessor 204 comprises a dynamically programmable FPGA 210, a programming interface 208 for programming the FPGA 210, a PLB interface 212, and an APU interface 214. The apparatus further comprises a memory 216 for storing configuration bit streams 220 for various functions that can be requested by applications executed by the processor 202. The memory 216 can be embedded on a chip along with the processor 202 and coprocessor 204 or external to the chip. According to the present invention, during the execution of an application by the processor 202, if a function requested by the application had not been programmed into the FPGA 210, the configuration bit stream for the function can be fetched from the memory 216, and sent to the programming interface 208 via a programming channel 218 coupled to the PLB 206. The FPGA 210 are then programmed with the fetched configuration bit stream. Once programmed, the function requested by the application can be performed by the coprocessor 204. In this manner, the FPGA 210 are programmable "on the fly", i.e., dynamically during the execution of an application.

Figure 3:
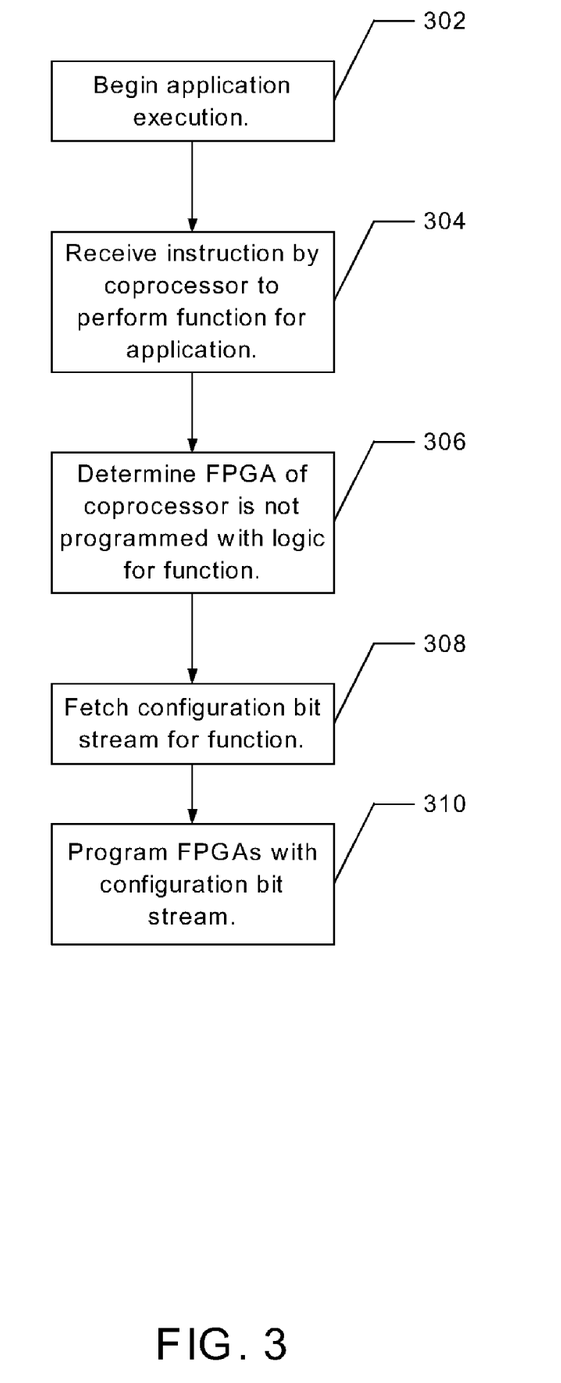
FIG. 3 is a flowchart illustrating a preferred embodiment of a method for dynamically programming an FPGA in accordance with the present invention.

FIG. 3 is a flowchart illustrating a preferred embodiment of a method for dynamically programming an FPGA in accordance with the present invention. First, the execution of an application by the processor 202 begins, via step 302. Next, the coprocessor 204 receives an instruction from the processor 202 to perform a function for the application, via step 304. In the preferred embodiment, the instruction is sent to the APU interface 214 of the coprocessor 204. Next, it is determined that the FPGA 210 of the coprocessor 204 is not programmed with the logic for the requested function, via step 306. In the preferred embodiment, the APU interface 214 returns an error when the FPGA 210 is not programmed with the logic to perform the function. Then, the processor 202 fetches the configuration bit stream 220 for the function from the memory 216, via step 308. The FPGA 210 is then programmed in accordance with the configuration bit stream 220, via step 310.

In the preferred embodiment, when the processor 202 receives the error from the APU interface 214, the processor 202 initiates the exception subroutine 222, which fetches the configuration bit stream 220 for the function from the memory 216. The bit stream 220 is then sent to the programming interface 208 via the programming channel 218. In the preferred embodiment, the programming channel 218 is a Direct Memory Access (DMA) channel. The exception subroutine 222 of the processor 202 would point the DMA channel to the location in the memory 216 where the configuration bit stream 220 for the requested function is stored. The DMA then fetches the configuration bit stream 220 and writes the configuration bit stream 220 into the FPGA 210. Other types of programming channels can be used without departing from the spirit and scope of the present invention. For example, Input/Output (I/O) register logic on the PLB 206 can be used, through which the processor 202 can program the FPGA 210 directly.

Figure 4:
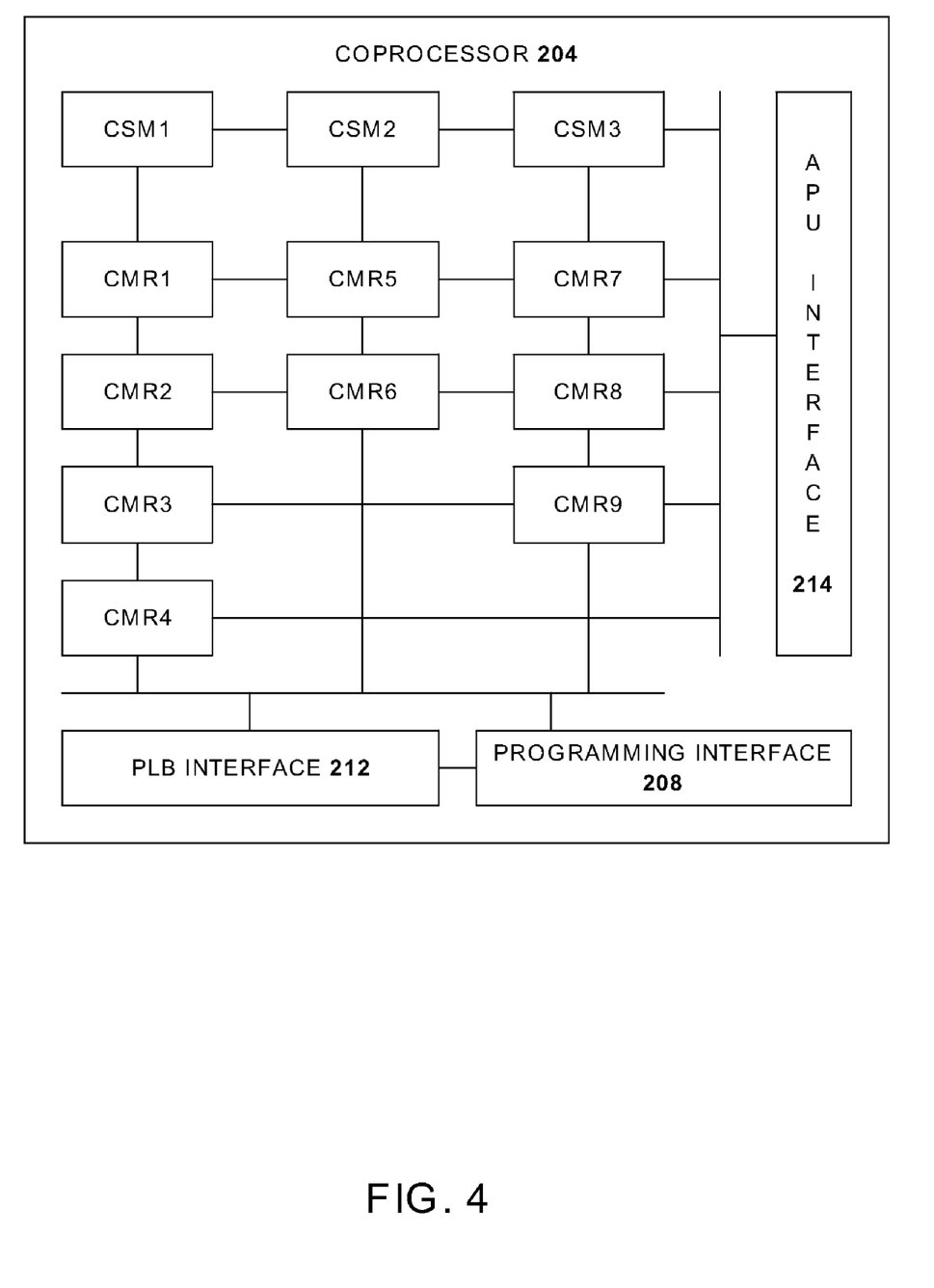
FIG. 4 illustrates a preferred embodiment of a coprocessor with dynamically programmable FPGA in accordance with the present invention.

FIG. 4 illustrates a preferred embodiment of a coprocessor 204 with a dynamically programmable FPGA in accordance with the present invention. The coprocessor 204 comprises a plurality of coprocessor state machines (CSM1-CSM3). Each coprocessor state machine (CSM) represents a function type and manages one or more coprocessor managed resources (CMR1-CMR9). The coprocessor managed resources (CMR) represent the logic inside the FPGA 210 for each coprocessor function managed by its corresponding CSM. An instruction received by the APU interface 214 describes the instruction type and may contain additional information or parameters. The APU interface 214 forwards the instruction to the appropriate CSM based on the instruction type. The CSM then executes the appropriate CMR for the requested function. If none of the CMRs were programmed with the requested function, the APU interface 214 returns an error to the processor 202. The configuration bit stream for the requested function is fetched, and the appropriate CMR is programmed with the configuration bit stream, as described above.

For example, assume that the application issues an instruction to the coprocessor 204, requesting that a specific event timer function be performed, via step 302. The APU interface 214 receives the instruction and forwards the instruction to CSM1, which manages event timer functions. CSM1 determines that the logic for the requested event timer function has not been programmed into any of CMR1-CMR4, via step 306. The APU interface 214 returns this error to the processor 202. The processor 202 then executes the exception subroutine 222. The exception subroutine 222 fetches the configuration bit stream for the requested event timer function from memory 216, and sends the configuration bit stream to the programming interface 208. One of the CMR's is then programmed with the appropriate configuration bit stream.

Figure 5:
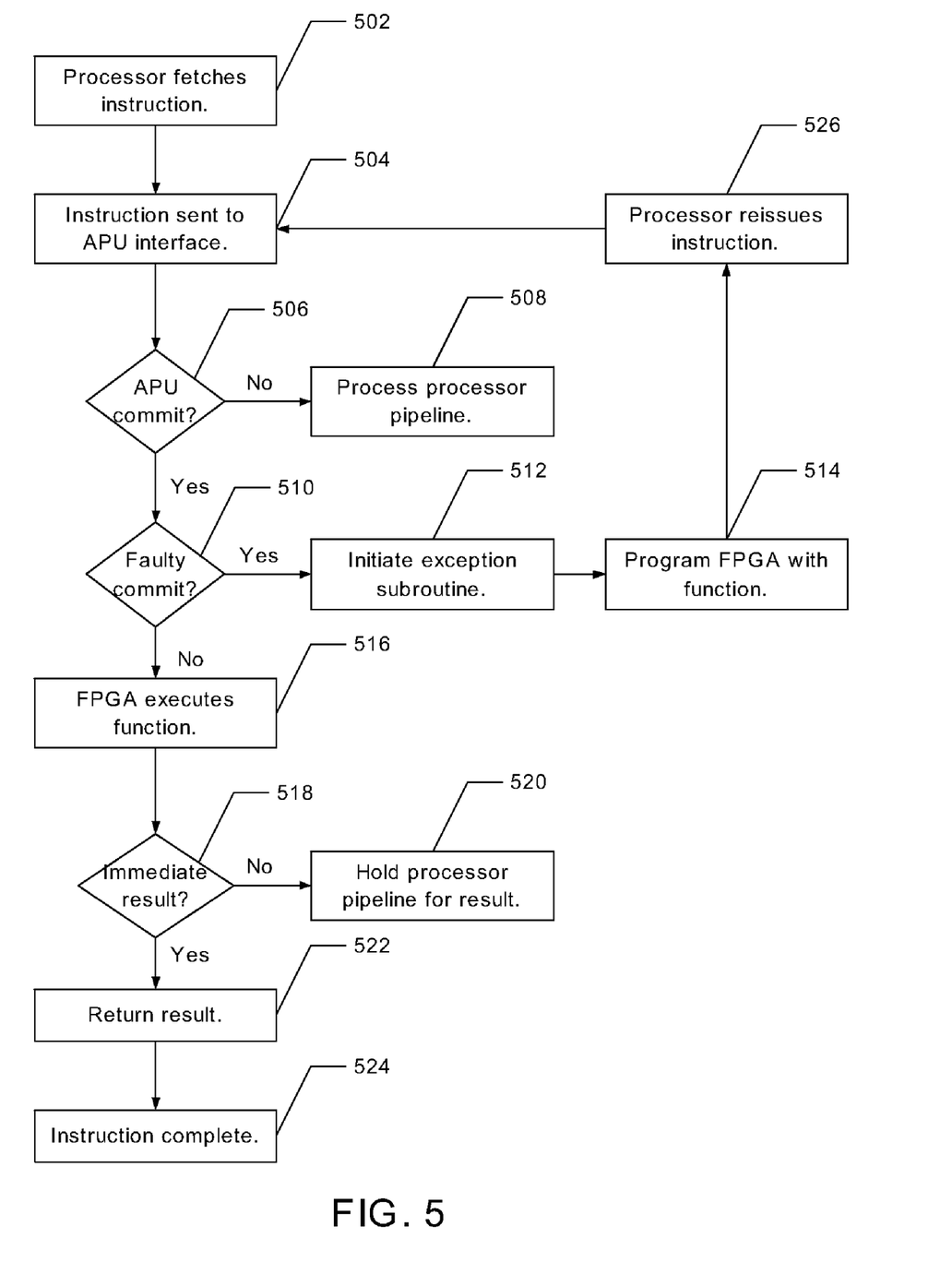
FIG. 5 is a flowchart illustrating in more detail the preferred embodiment of the method for dynamically programming an FPGA in accordance with the present invention.

FIG. 5 is a flowchart illustrating in more detail the preferred embodiment of the method for dynamically programming an FPGA in accordance with the present invention. During execution of an application, the processor 202 fetches an instruction, via step 502. The instruction is sent to the APU interface 214, via step 504. If the instruction is for the coprocessor 204, the APU interface 214 issues a commit, via step 506. If not, the APU interface 214 processes the next instruction on the processor pipeline, via step 508. If the APU interface 214 commits, then the APU interface 214 attempts to execute the function. If the function has been programmed into the FPGA 210, then the FPGA execute the function, via step 516. If the coprocessor 204 can then respond immediately with a value in the results register, via step 518, then the result is returned, via step 522, and the instruction completes, via step 524. If the results cannot be returned immediately, then the function requires more clock cycles to complete, and the processor pipeline is held for the result, via step 520.

If the function has not been programmed into the FPGA 210, then the APU interface commit is a faulty commit, via step 510. With the return of a faulty commit, the processor 202 initiates the exception subroutine 222, via step 512. The exception subroutine 222 then programs the FPGA 210 with the requested function, via step 514. Once programmed, the processor 202 reissues the original instruction, via step 526.

Figure 6:
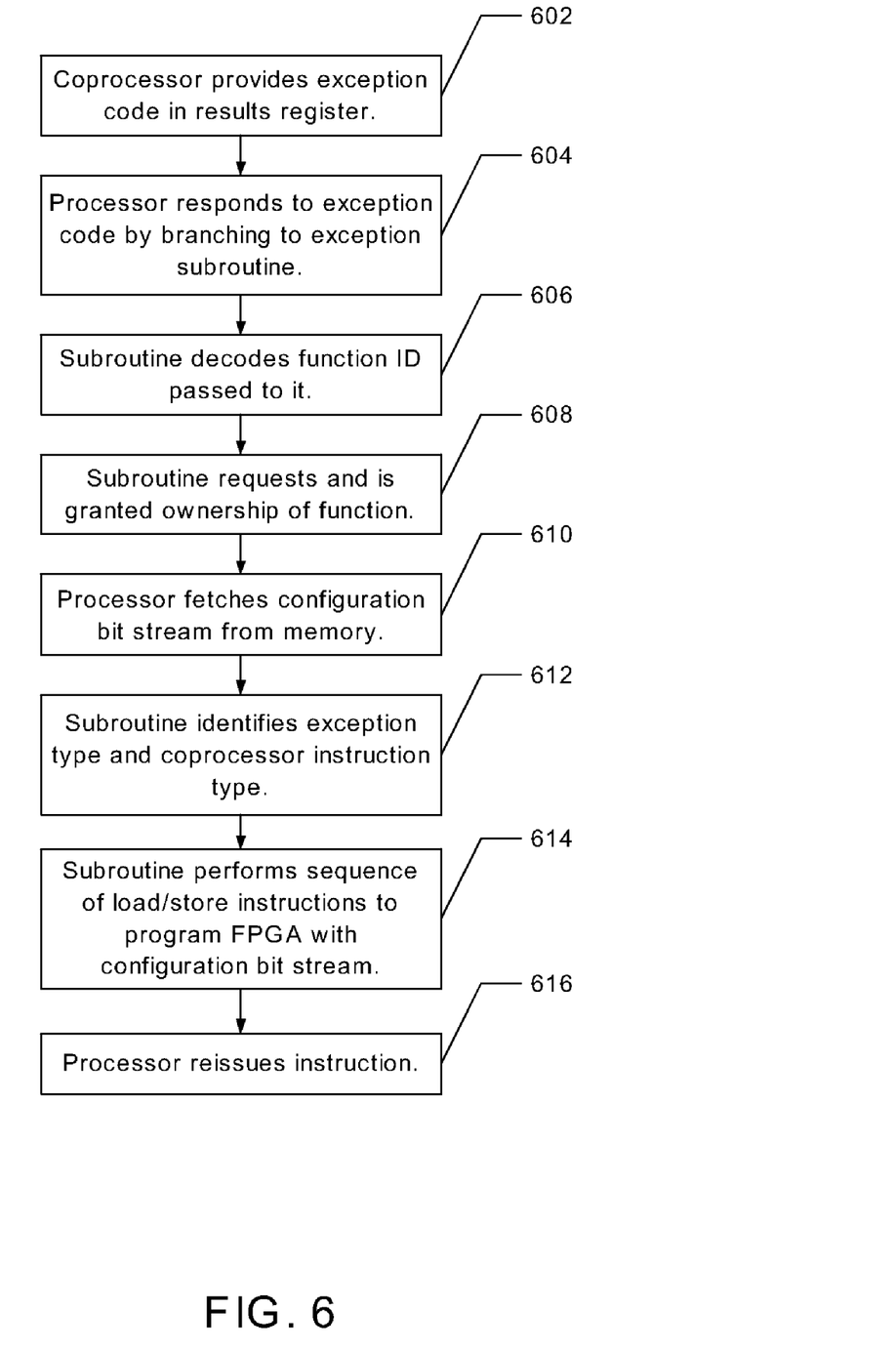
FIG. 6 is a flowchart illustrating in more detail the programming of the FPGA with the desired function in accordance with the present invention.

FIG. 6 is a flowchart illustrating in more detail the programming of the FPGA with the desired function in accordance with the present invention. If the function has not been programmed into the FPGA 210, the coprocessor 204, and more specifically the APU interface 214, provides an exception code in a results register, via step 602. The processor 202 responds to the exception code by branching to the exception subroutine 222, via step 604. The exception subroutine 222 decodes the function identifier passed to it, via step 606. The exception subroutine 222 then requests and is granted ownership of the required function by the programming channel 218 across the PLB 206, via step 608. The processor 204 then fetches the configuration bit stream 220 for the function from the memory 216, via step 610. The exception subroutine 222 identifies the exception type and the coprocessor instruction type, via step 612. The exception subroutine 222 then performs a sequence of load/store instructions via the programming channel 218 and the programming interface 208 to program the FPGA 210 with the configuration bit stream, via step 614. The processor 202 then reissues the instruction, via step 616.

Although the details of the dynamic programming of the FPGA can be handled in software, as described above in FIGS. 5 and 6, performing the dynamic programming can also be performed in hardware without departing from the spirit and scope of the present invention.

Figure 7:
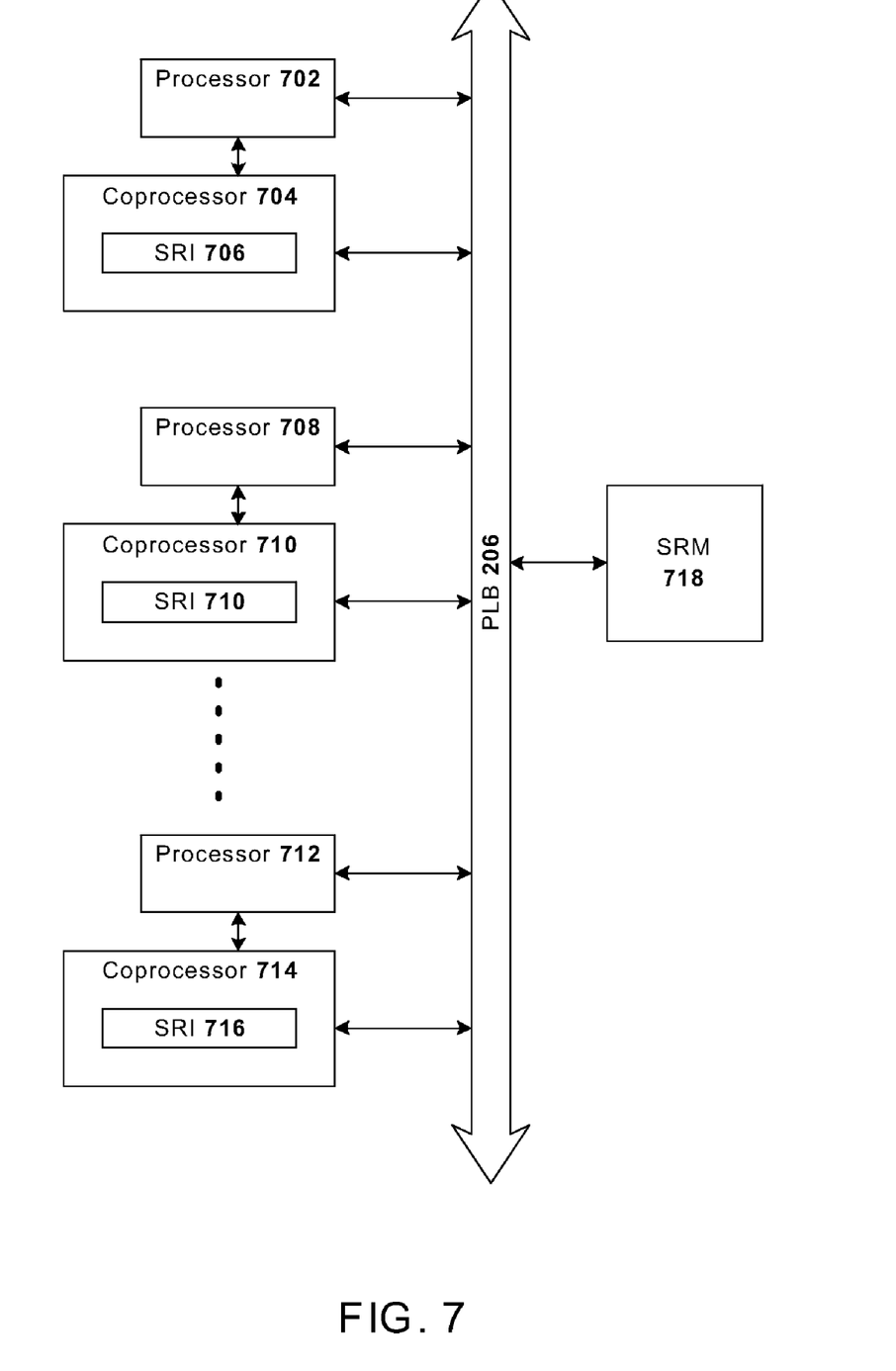
FIG. 7 illustrates a second preferred embodiment of the apparatus for dynamically programming an FPGA in accordance with the present invention.

FIG. 7 illustrates a second preferred embodiment of the apparatus for dynamically programming an FPGA in accordance with the present invention. In this embodiment, a plurality of processors 702, 708, and 712 share system resources, such as program memory (not shown) and coprocessors 704, 710, and 714. Each coprocessor 704, 710, and 714 acts as a Shared Resource Agent and each is attached to the PLB 206 through a Shared Resource Interface (SRI) 706, 710, and 716, respectively. Coupled to the PLB 206 is a Shared Resource Manager (SRM) 718. The SRM 718 guarantees data consistency is maintained between the shared resources by making sure the right to modify a given resource is only given to one processor at a time. Each processor 702, 708, 712 and coprocessors 704, 710, 714 can independently access the shared system resources through their respective SRI 706, 710, 716, with their access controlled by the SRM 718. The programming of the FPGAs in each of the coprocessors 704, 710, 714 is performed in the same manner as described above, except the SRM 718 can serve as the programming channel 218, and the instructions fetched by a processor 702, 708, 712 can be sent to the FPGAs (not shown) of any of the coprocessors 704, 710, 714. The SRM 718 can program a fetched configuration bit stream 220 into an FPGA associated with coprocessors 704, 710, 714. Alternatively, each processor 702, 708, 712 can request a resource from the SRM 718. After the SRM 718 grants the resource to a given processor, the processor programs an appropriate FPGA.

Another exception condition can occur when the requested function must be loaded into a coprocessor but there is not enough unused logic resources in the FPGAs associated with the coprocessor to program the new function. In this situation, a Least Recently Used (LRU) algorithm can be implemented either in the coprocessor or as a thread running on the processor. A LRU function manager keeps track of the functions loaded into the coprocessors and how often each has been used in a given period of time. This LRU function manager can be queried to determine which old function can be disabled to free up logic resources to load the new function. In this way, the coprocessor can act as a cache of functions for the processor. This library of functions is managed by the SRM 718. The exception processing of the processor is the same as described above except for the added delay caused by the LRU function manager operation.

A method and apparatus for dynamically programming an FPGA have been disclosed. The method includes beginning an execution of an application by the processor; receiving an instruction from the processor by the coprocessor to perform a function for the application; determining that the FPGA in the coprocessor is not programmed with logic for the function; fetching a configuration bit stream for the function; and programming the FPGA with the configuration bit stream. In this manner, the FPGA is programmable "on the fly", i.e., dynamically during the execution of an application. Logic flexibility and space savings on the chip comprising the coprocessor and processor are provided as well.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for dynamically programming a field programmable gate array (FPGA) in a coprocessor, comprising:
   providing a plurality of processors;
   sharing a program memory among the plurality of processors;
   executing an application in a first processor of the plurality of processors;
   providing a plurality of coprocessors, each coprocessor being coupled to a corresponding processor from the plurality of processors and including a FPGA;
   sending an instruction from the program memory to each of the plurality of coprocessors to perform a function for the application; and
   if none of the FPGAs associated with the plurality of coprocessors are programmed to perform the function for the application, dynamically programming any one of the FPGAs to perform the function for the application, including selecting the FPGA in accordance with a least recently used algorithm, the least recently used algorithm specifying a function that can be disabled to free up logic resources within the FPGA selected to be dynamically programmed.

2. The method of claim 1, further comprising:
   receiving instructions from the first processor; and
   determining whether a given instruction is to be processed by one or more coprocessors of the plurality of coprocessors.

3. The method of claim 2, further comprising:
   issuing a fault commit if the given instruction is to be processed by a coprocessor and the FPGA in the one or more coprocessors is not programmed to perform a function corresponding to the given instruction.

\* \* \* \* \*